United States Patent
Tolbert, II

(10) Patent No.: US 7,383,040 B2
(45) Date of Patent: *Jun. 3, 2008

(54) VIRTUAL TECHNICIAN FOR PROVIDING TECHNICAL SUPPORT FOR MANIPULATION OF RADIOTELEPHONES

(75) Inventor: Robert E. Tolbert, II, Kennesaw, GA (US)

(73) Assignee: AT&T Delaware Intellectual Property, Inc., Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 11/433,949

(22) Filed: May 15, 2006

(65) Prior Publication Data

US 2006/0209179 A1    Sep. 21, 2006

Related U.S. Application Data

(63) Continuation of application No. 09/878,630, filed on Jun. 11, 2001, now Pat. No. 7,047,004.

(51) Int. Cl.
- H04Q 7/20 (2006.01)
- H04M 3/42 (2006.01)
- H04M 3/00 (2006.01)

(52) U.S. Cl. .................. 455/425; 455/550.1; 455/411; 455/418; 455/419

(58) Field of Classification Search ............. 455/186.1, 455/67.1, 403, 411, 423, 418–419, 517, 550.1; 379/201.01, 201.04, 201.05, 201.12; 348/14.01

See application file for complete search history.

(56) References Cited

U.S. PATENT DOCUMENTS

| | | |
|---|---|---|
| 5,046,082 A * | 9/1991 | Zicker et al. .............. 455/419 |
| 5,835,858 A | 11/1998 | Vaihoja et al. |
| 6,029,065 A * | 2/2000 | Shah ..................... 455/414.4 |
| 6,035,189 A | 3/2000 | Ali-Vehmas et al. |
| 6,243,574 B1 | 6/2001 | McGregor et al. |
| 6,332,154 B2 | 12/2001 | Beck et al. |
| 6,377,944 B1 | 4/2002 | Busey et al. |
| 6,400,940 B1 | 6/2002 | Sennett |
| 6,529,727 B1 | 3/2003 | Findikli et al. |
| 6,546,243 B2 | 4/2003 | Tiedemann et al. |
| 6,577,858 B1 | 6/2003 | Gell |
| 6,622,017 B1 | 9/2003 | Hoffman |
| 6,636,489 B1 | 10/2003 | Fingerhut |
| 6,647,260 B2 | 11/2003 | Dusse et al. |
| 6,650,889 B1 | 11/2003 | Evans et al. |
| 6,748,209 B2 | 6/2004 | Lipsit |
| 6,763,104 B1 | 7/2004 | Judkins et al. |
| 2001/0053688 A1 | 12/2001 | Rignell et al. |
| 2002/0023144 A1 | 2/2002 | Linyard et al. |
| 2002/0055358 A1* | 5/2002 | Hebert .................... 455/423 |
| 2002/0062367 A1 | 5/2002 | Debber et al. |
| 2002/0119786 A1 | 8/2002 | Boehmke |
| 2003/0100290 A1 | 5/2003 | McGregor et al. |

\* cited by examiner

*Primary Examiner*—Binh K Tieu
(74) *Attorney, Agent, or Firm*—Cantor Colburn LLP

(57) ABSTRACT

The present invention relates to a virtual technician adapted to run on different platforms and to provide programming instructions and trouble shooting tips to users. The virtual technician can run on a computer or a radiotelephone. It allows a user to learn how to program or to trouble shoot a radiotelephone without going through a technical manual. The virtual technician prompts the user to select the task and displays the information on a user interface screen. The virtual technician may also assist the user to program a radiotelephone.

16 Claims, 7 Drawing Sheets

VIRTUAL TECHNICIAN FOR PROVIDING TECHNICAL SUPPORT FOR MANIPULATION OF RADIOTELEPHONES

CROSS-REFERENCE TO RELATED APPLICATIONS

This application is a continuation of U.S. patent application Ser. No. 09/878,630 filed Jun. 11, 2001, now U.S. Pat. No. 7,047,004 the contents of which are incorporated by reference herein in their entirety.

TECHNICAL FIELD

This invention is related to the field of distributed computing, and more specifically related to providing video, audio, and data information to a remote client.

BACKGROUND OF THE INVENTION

The advent of mobile communication technology has led to the proliferation of radiotelephones (also known as wireless telephone). Now a person can carry with them a radiotelephone anywhere they go. A person can make a telephone call from almost anywhere to another person and can also receive a telephone call from anywhere. Radiotelephones have transitioned from being a luxury item for special professionals used only in emergency situations to a staple item used in people's daily lives.

This popularization has helped to lower prices of radiotelephones and lower prices of wireless services. Now, there are dozens of equipment manufacturers and hundreds of wireless service providers. Each equipment manufacturer produces a plurality of models of radiotelephones and each wireless service provider offers a multiplicity of service plans.

Generally, the radiotelephones are sold as part of packages offered by the service providers. Consumers can get a radiotelephone for very little money, or no money at all, by signing up for wireless services with a service provider. The service providers often offer the radiotelephones for free and set them up for the consumers hoping to retain the consumers as long-term customers.

When a consumer needs a radiotelephone and a wireless communication service, all he needs to do is go to a wireless service provider's store. The consumer can choose a radiotelephone from among many models made by different manufacturers and offered by the service provider. After selecting a radiotelephone and choosing a service plan, the salesperson generally programs the radiotelephone with a mobile identification number (MIN) and enters this MIN into the service provider's database indicating the MIN as belonging to an active customer. The salespeople may also help the customers to program other features of their radiotelephones and solve problems the customers may have with these radiotelephones.

The radiotelephones are gaining more capabilities and are becoming more sophisticated everyday. They are no longer simple communication devices. Just a few years ago, a radiotelephone only performed the simple tasks of sending and receiving communication signals to and from a communication tower. The radiotelephone did not do much besides taking in a destination telephone number, when a user placed an outgoing call, and ringing when a call was received. In comparison, now a radiotelephone can receive and respond to a voice command from users, store frequently dialed telephone numbers, provide options of ringing or vibrating as a means of notification, etc.

Radiotelephones are no longer simple voice terminals anymore, but rather have become multi-purpose data terminals. For example, many service providers are providing Internet access to their radiotelephone service subscribers. A subscriber now can receive latest news, weather, and other information from their hand-held wireless device, as well as reading e-mails or receiving page messages. Some radiotelephones can also function as two-way radios by using special frequencies.

All of these capabilities have made life easier for many users, but at the same time making it almost impossible for users to remember how to control all of these capabilities. To master all the capabilities of a modem radiotelephone handset, a user has to memorize a thick users manual, which is getting more complex everyday. It has become increasingly impossible for users to program their handsets without spending a long time reading the users manuals, and the users manuals continue to get technically more complex.

Even for salespersons at a service provider's retail store, whose job is to help users to program radiotelephones, the programming of handsets has become a time-consuming task that must be performed with reference to the user manuals.

Therefore, there is a need for a system that helps consumers and salespersons to program wireless handsets.

SUMMARY OF THE INVENTION

Briefly described, the present invention is a virtual technician that helps users to better utilize their wireless communication devices. The virtual technician comprises systems and applications that provide users with technical instructions on the operation of wireless communication devices and assist the users to program their wireless communication devices.

A virtual technician according to one embodiment of the present invention resides on a server connected to a network such as the Internet and can be invoked from a computer in communication with the server. The virtual technician assists the users to program their wireless communication devices, generally radiotelephones, by prompting options for and accepting inputs from the users.

The virtual technician prompts a user for the information the user seeks, for example, programming instructions, trouble-shooting tips, or telephone features. The virtual technician presents a selection of tasks described in functional language that is easily understood by the user. The description relates to what the user wants to do, for example put a number into a speed dial list, instead of what a wireless device is capable of doing, i.e., programming entries into a memory. After the user inputs the selection, the virtual technician interprets the user's input and searches for information to respond to the user's input. The information may be built into the virtual technician or on an external database is needed to obtain the information. The information can be in text format, graphic format, audio format, video format, or a combination of these formats.

After locating the requested information, the virtual technician will display the information on the user's interface device, which is likely to be a computer. The text information will be displayed in coordination with video and audio information. Alternatively, the information retrieved can have data in graphic format instead of the video format, and this graphic data can also be displayed on the user's interface device.

In an alternate embodiment, users can invoke the virtual technician directly from their wireless hand-held devices instead of from their computer. The virtual technician is transmitted from a server to the user's hand-held device through wireless transmission.

The system can help a new radiotelephone user become familiar with the new handheld device. For example, when the user receives the new hand-held wireless communication device, the user may want to learn special features of his wireless device or to change settings of this device. Instead of going back to the service provider's store or the retail store from which he purchased the device, he can invoke a virtual technician through a special service provided by his service provider. Through this service, the virtual technician can be downloaded to the wireless device. Before downloading the virtual technician, the server makes inquiry to the model of the wireless device, so the correct virtual technician is downloaded. The virtual technician interfaces with the user by taking inputs, interpreting inputs, searching for answers, and displaying the answers to the user. The virtual technician in this embodiment is capable of interfacing with the wireless device and changing the settings of the wireless device.

The virtual technician, according to the present invention, permits users to use their wireless communication devices efficiently without the need to consult with technical manuals that are generally supplied with the wireless devices.

DESCRIPTION OF THE DRAWINGS

The foregoing and other aspects and advantages of the invention described herein will be better understood from the following detailed description of one or more preferred embodiments of the invention with reference to the drawings in which.

DETAILED DESCRIPTION OF THE INVENTION

Figure 1:
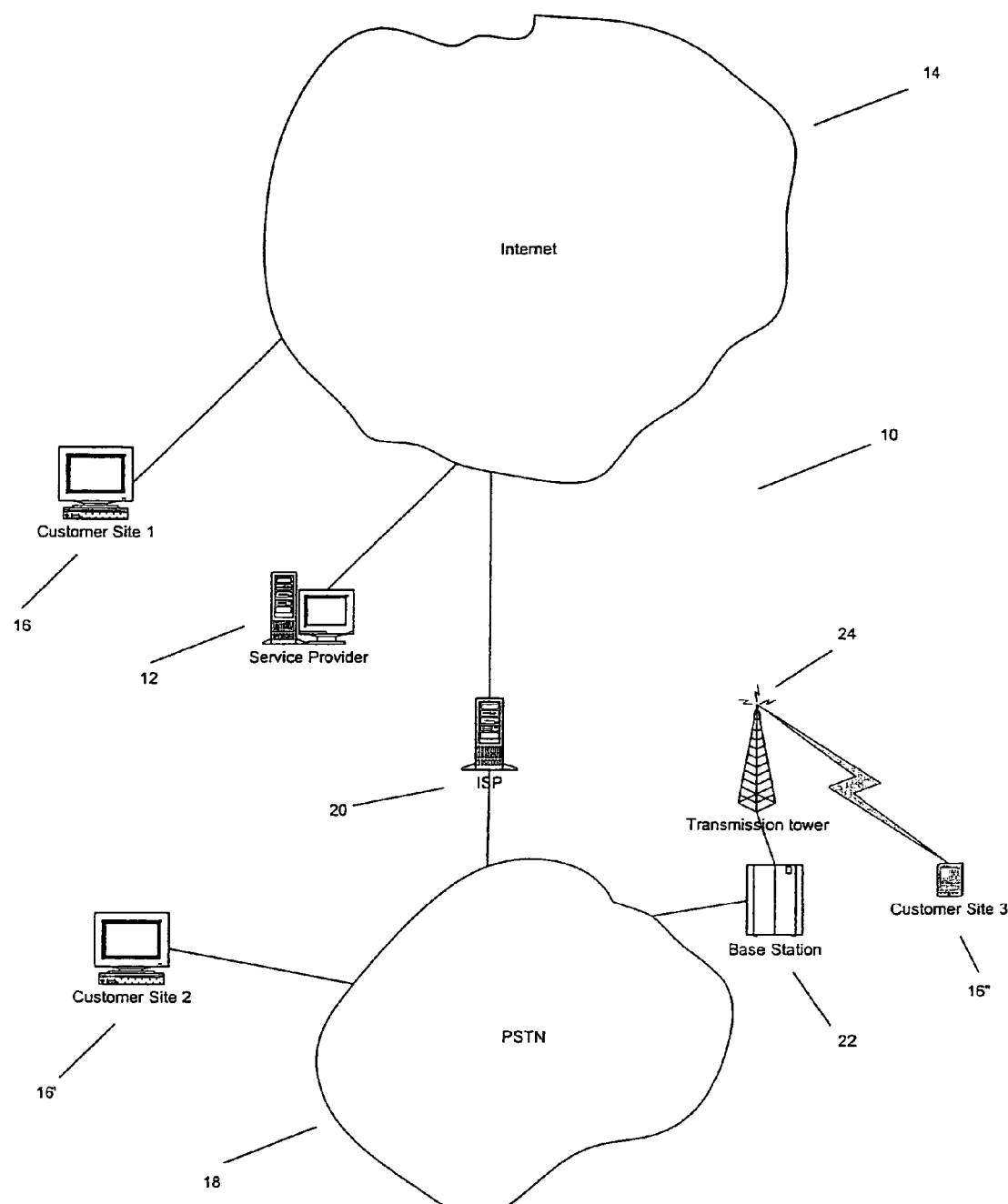
FIG. 1 depicts system architecture according to one embodiment of the present invention.

Referring now in greater details to the drawings, in which like numerals represent like components throughout several views, FIG. 1 depicts a system 10 according to the present invention. The system 10 includes a server 12 where virtual technicians according to the present invention reside, a network 14 connected to the server 12 and providing access to the server 12, user interface devices 16 located at customer sites, Internet Service Providers (ISP) 20 who provide Internet access to users who have no direct connection to the Internet, and a wireless hand-held device 16" that is in communication with the server 12 through a transmission tower 24, and a base station 22.

A user for the present invention can be a radiotelephone salesperson, a salesperson at a service provider's store, a technical support person at a service provider's customer service center, an end-user, or anyone who needs assistance to operate a radiotelephone and has access to a server 12 where an embodiment of the present invention is located. The user can invoke a virtual technician according to the present invention through a user interface device 16. The user interface device 16 can be any device that has display capability and can communicate with the server 12. Examples of the user interface devices 16 are personal computers, workstations, dumb terminals, wireless communication devices such as radiotelephones, personal digital assistants (PDAs) equipped with communication means, etc. The user interface device 16 can be located, for example, at an end-user's home, in a radiotelephone store, in a wireless service provider's retail store, or in a wireless service provider's customer support center.

The user interface device 16 connects to the server 12 through a network. The user interface device 16 can be connected directly to a network, such as a Local Area Network (LAN), a Wide Area Network (WAN), or the Internet 14. A user may have direct access to the server 12, if the user interface device 16 is connected directly to the server 12 or the same network 14 that the server 12 is connected to.

If the user interface device 16 is not directly connected to the network, the user may need to access an intermediate service, such as an Internet Service Provider (ISP), to reach server 12. In this situation, the user using his interface device 16 accesses his ISP 20 through, for example, a public switched telephone network (PSTN) 18, and then accesses the server 12 through the ISP 20. If the user uses a wireless user interface device 16", then the user dials into the ISP 20 through a wireless network, which may involve radio communication to a transmission tower 24 and a base station 22. Once the user establishes the connection with the ISP 20, he can access the server 12 through the Internet 14. People skilled in the art may appreciate other ways to access the server 12 not illustrated by FIG. 1.

The server 12 is connected to a network, generally the Internet 14. The server 12 can be a general purpose computer where virtual technicians according to the present invention reside. Briefly described, the virtual technicians are specialized computing systems with some intelligence and designed for specific purposes. The virtual technician according to one embodiment of the present invention is designed specifically to interface with both human users and different models of radiotelephone.

Figure 2:
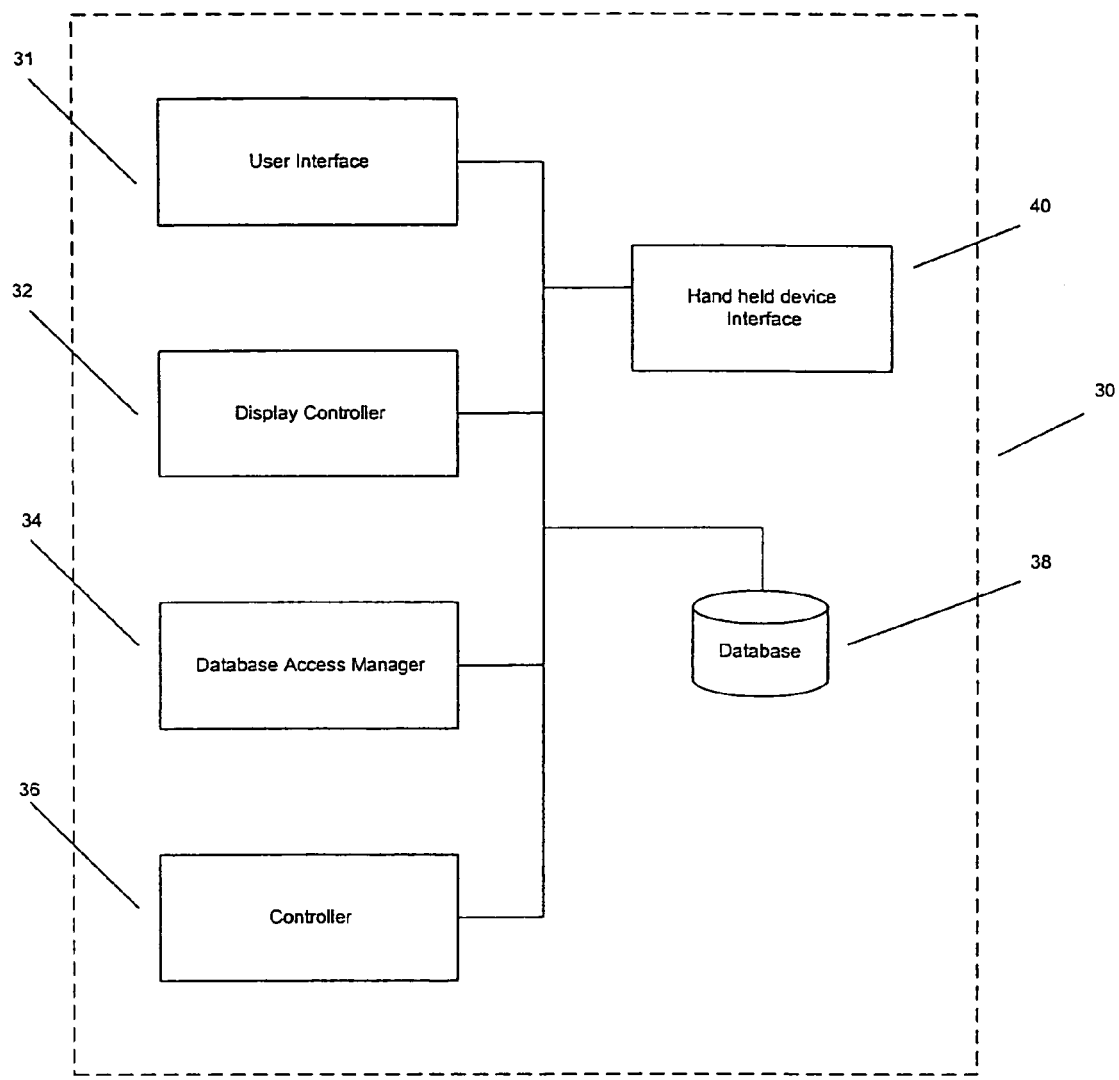
FIG. 2 depicts software architecture of a virtual technician according to one embodiment of the present invention.

FIG. 2 depicts software architecture of a virtual technician 30 according to one embodiment of the present invention. The virtual technician 30 comprises a user interface 31, a display controller 32, a database access manager 34, a controller 36, an optional hand-held device interface 40, and an optional internal database 38.

The virtual technician 30 can be implemented with different software programming language. In one embodiment, the virtual technician 30 is implemented if Java™.

The user interface 31 is responsible for interfacing with users. Besides taking inputs from the users and interpreting them, the user interface 31 also sends information to the users.

Figure 3:
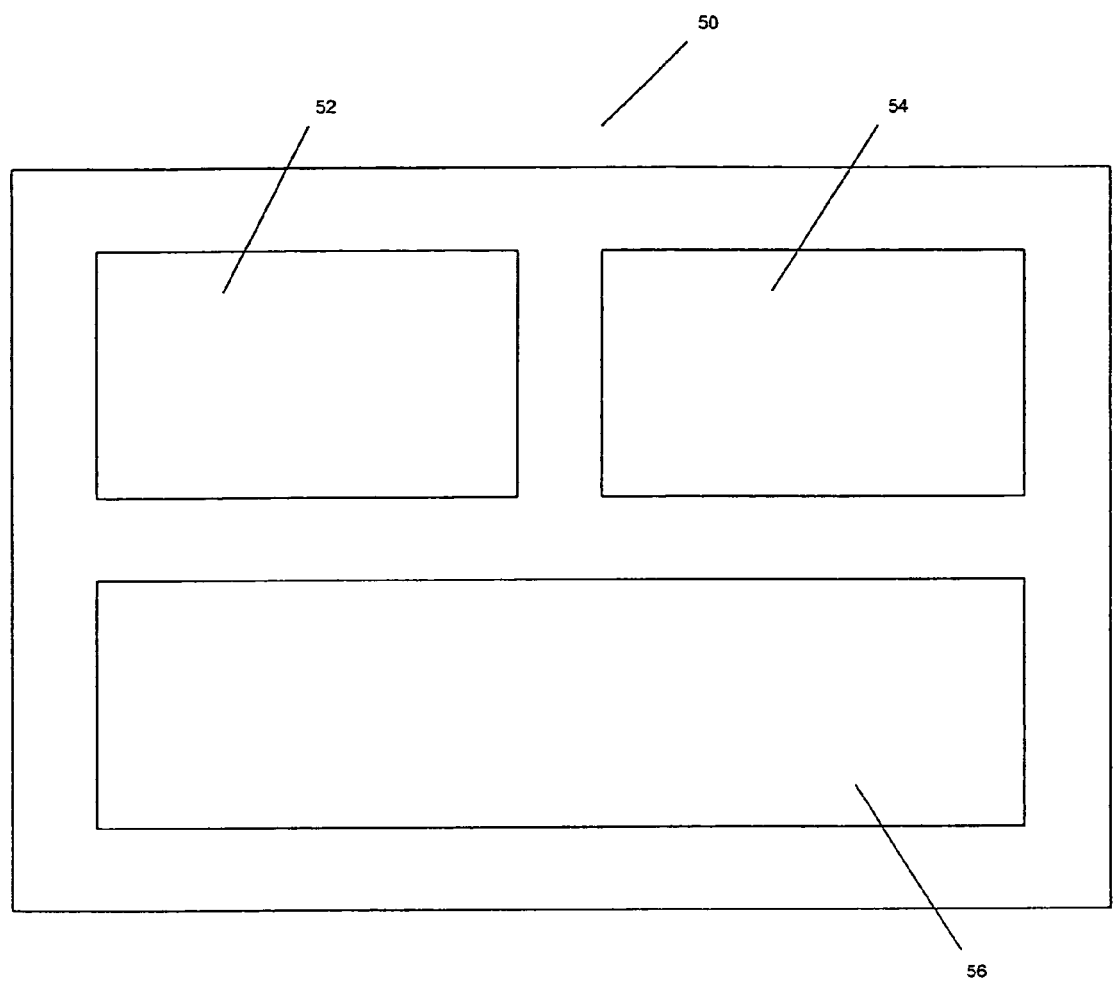
FIG. 3 illustrates a display screen according to one embodiment of the present invention.

The display controller 32 controls the display of information to the user. The type of information shown to the user can be a video clip, an audio recording, a graphic display, or plain text. The display controller 32 ensures that the correct information is displayed in their proper display areas. The display area is shown in FIG. 3.

The database manager 34 interfaces with database 38, whether the database is internal or external. The database manager 34 searches and retrieves the information from the database 38.

The controller 36 is responsible for the overall operations for the virtual technician 30, and the controller 36 interfaces with user interface 31, display controller 32, database access manager 34, and hand-held device interface 40.

The hand-held device controller interface 40 is responsible for interfacing with the hand-held user devices such as radiotelephones. Since the radiotelephones may be produced by different manufacturers and followed different standards, the hand-held device controller 40 may be specialized according to radiotelephone models. For example, the hand-held device controller 40 in one virtual technician 30 designed for a radiotelephone of model A may be different from the hand-held device controller 40 in another virtual technician 30 designed for another radiotelephone of model B.

FIG. 2 illustrates an internal database 38. In some embodiments, the database may be an external. Generally, an internal database allows a virtual technician to run faster. On the other hand, an internal database increases the size of a virtual technician. For an embodiment of the virtual technician 30 that runs on a radiotelephone, the internal database 38 may be used to prevent time delay in retrieving information from the database.

FIG. 3 depicts a display screen 50 according to one embodiment of the present invention. The display screen 50 comprises a video area 52, an instruction area 54, and a selection area 56. The size of the display screen 50 is adaptable to the display screen of a hand-held device, and the dimensions of each individual area are adjusted automatically by hand-held devices. The display screen 50 can be monotone or color.

The display screen 50, according to one embodiment, may also include a plurality of control buttons (not shown in FIG. 3) for controlling video and audio displays. The control buttons may include buttons, such as pause, rewind, fast forward, and play. The control buttons control both video and audio.

The video display area 52 is adapted to display video files of different formats, such MPEG (Moving Pictures Experts Group) or other industry standard format. The video display area 52 may also be equipped with a display indicator that indicates the display area 52 is in use.

The instruction area 54 displays text instructions. The text instructions may be coordinated with display of a video file in the video display area 52. The display controller 32 does the coordination between three display areas.

The selection area 56 is an area for users to enter inputs and commands to communicate with the virtual technician 30. The selection area 56 can have, among other possibilities, check boxes, selection windows, or input windows. The check boxes are boxes where the user can put a check mark indicating his selection. In the selection windows a list of choices is displayed to the user and the user can select one of the choices. The input windows are windows where the user can type in his responses.

In an alternate embodiment, where a user device has a small display screen, the selection area 56, the instruction area 54, and the video area 52 are not displayed simultaneously. This embodiment is suitable for user devices such as radiotelephones that have small display screens. Preferably, in this embodiment the selection area 56 is shown initially to display information to the user. After the user has entered all pertinent information, then the instruction area 54 is displayed with instructions or information. Finally, the video area 52 is displayed with video files.

Figure 4:
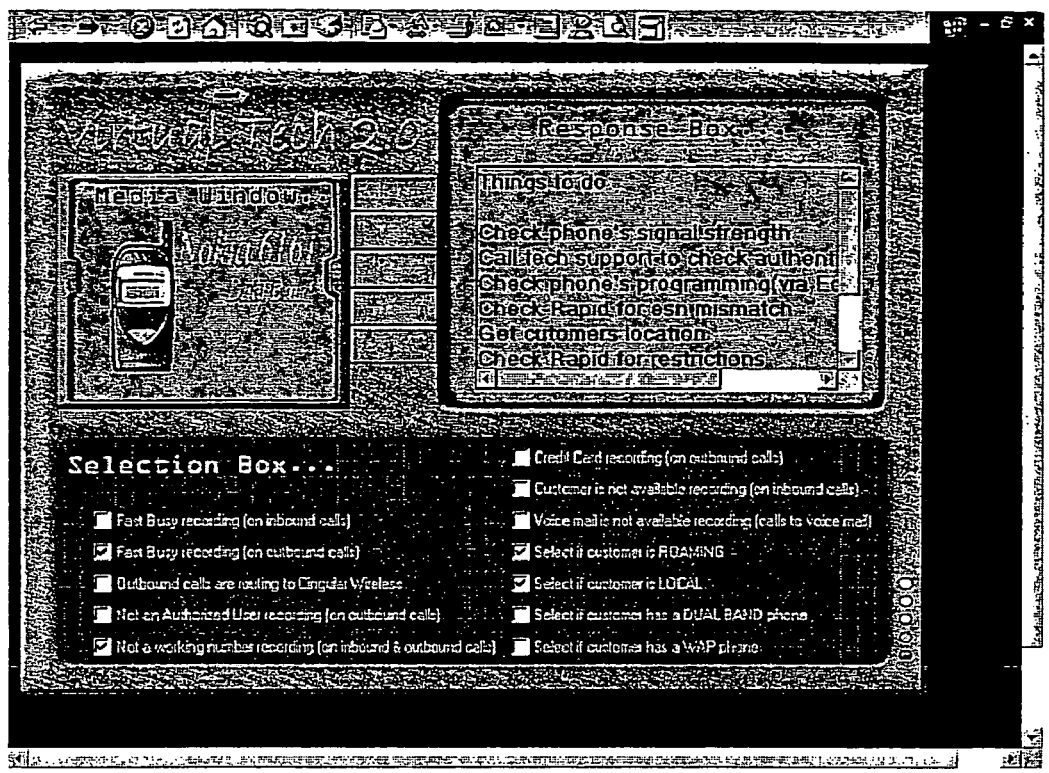
FIG. 4 depicts an exemplary display screen according to one embodiment of the present invention.

FIG. 4 is an illustration of one display screen 50 according to one embodiment of the present invention. In this embodiment the display screen 50 is shown in a Microsoft Windows™ environment. The display screen 50 is shown occupying partially the display area of Microsoft Internet Explorer™. However, the display screen 50 can alternately occupy the entire display area of Microsoft Internet Explorer™ or in an environment supported by a different operating system.

In the selection area 56 of FIG. 4, a list of selection boxes is shown, where multiple boxes are selected by check marks. Alternatively, the selection boxes can be implemented differently where only one selection is allowed. In yet another embodiment, the selection boxes can be divided in various categories, where one box per category can be selected.

FIG. 4 also shows a list of actions in the instruction area 54. The instruction area 54 is presented with two scroll bars in this embodiment: one vertical scroll bar and one horizontal scroll bar. The scroll feature allows the instruction area 54 to display a large amount of data even the instruction area 54 has limited in dimensions.

The video display area 52 is suited to display either video files or graphical images of different formats, and in the particular illustration of FIG. 4 the video display area 52 shows an image of a Nokia radiotelephone. The display of the video display area 52 can be controlled through the control buttons (not shown).

Figure 5:
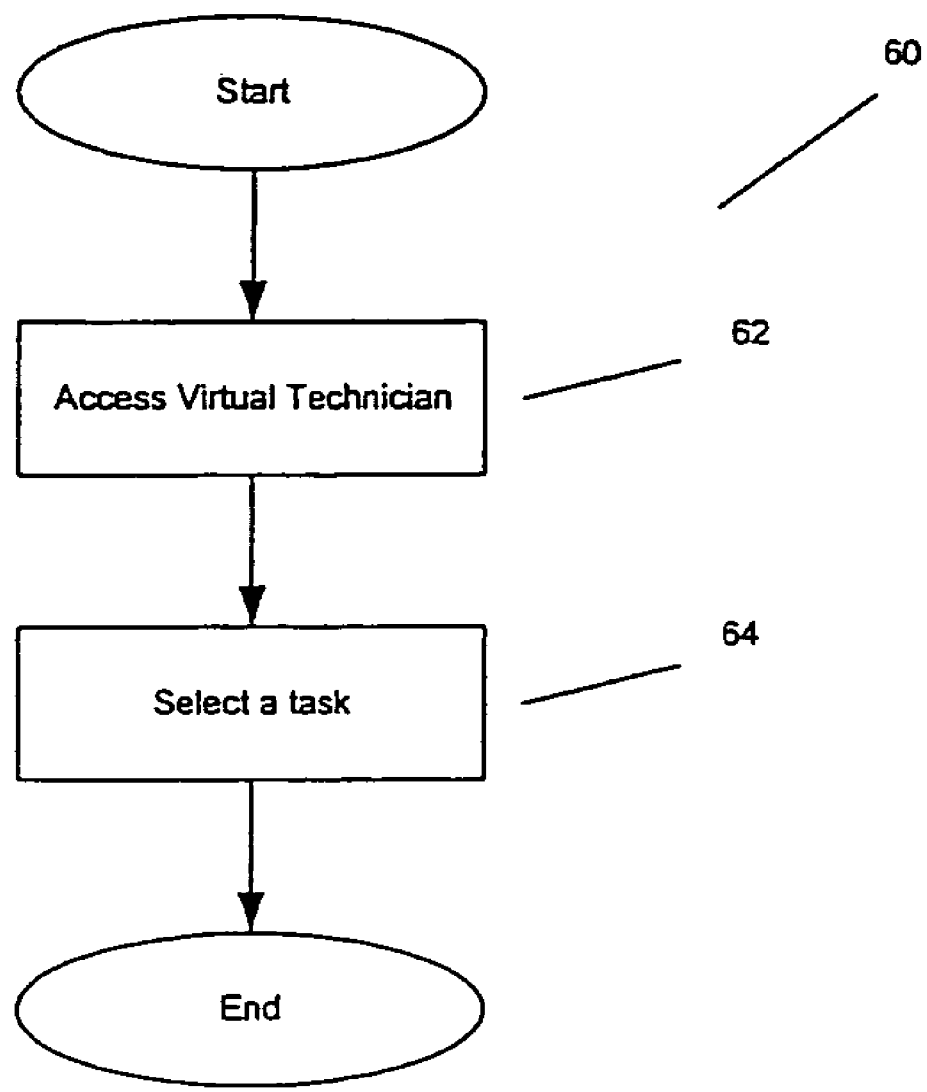
FIG. 5 illustrates an overall user process.

FIG. 5 illustrates a user process 60 according to one embodiment of the present invention. The user, as stated above, can be a consumer who purchased a radiotelephone or a salesperson who is helping a customer, but for the purpose of the following description the user is treated as a consumer. People skilled in the art will easily recognize the description is equally applicable if the user is a salesperson. The user starts the user process 60 after he purchases a radiotelephone and subscribes to services from a service provider. The user can purchase the radiotelephone at any electronic store or at the service provider's retail store. Generally, the service provider or the retailer sets up the radiotelephone for the user, so the user can send and receive radiotelephone calls. In the process illustrated in FIG. 5, the user uses the virtual technician to program additional features, step 62. The user accesses the virtual technician by using the radiotelephone and dialing into the service provider's customer service center or a special telephone number assigned to the virtual technician services. After reaching the virtual technician service and activating the virtual technician, the user can input his selection of service, step 64. The user enters his selection through the selection area 56. The user may select programming instructions, trouble shooting tips, or radiotelephone features for his radiotelephone. Other subject topics may be made available for the users. The step 64 is further expanded in FIGS. 6 or 7 depending on the user's selection.

In an alternate embodiment, the user can choose to access the virtual technician 30 by using a personal computer. The user accesses the service provider's virtual technician center through dialing into an Internet Service Provider (ISP) 20 and then connecting to the virtual technician center through the Internet 14. In yet another embodiment, the user can access the service provider's virtual technician through the Internet 14 directly, if his computer is connected to a LAN or WAN.

Figures 6, 7:
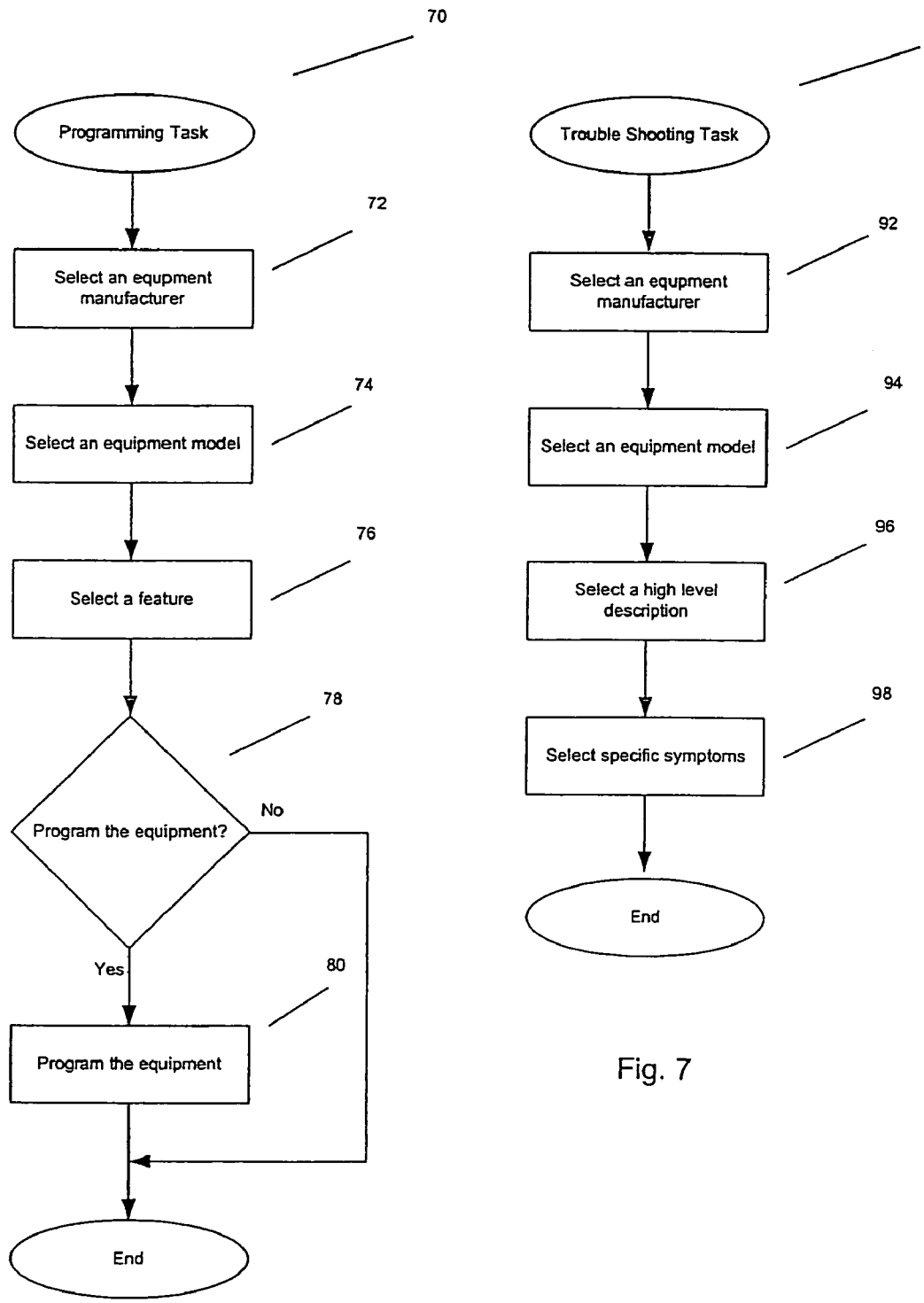
FIG. 6 illustrates a detailed user process for programming task.
FIG. 7 illustrates a detailed user process for trouble shooting task.

FIG. 6 illustrates an exemplary programming task 70. The programming task 70 allows users to easily program their radiotelephones, such as to program their own telephone number, to store frequently used telephone numbers, to set time and date, to select ringing style, to change from ringing to vibrating mode, to set lock, to change a password, etc. The programming task 70 can make the programming task easy without need to consult a technical manual. The user first selects an equipment manufacturer, step 72, and then selects an equipment model, step 74. To support different manufacturers and different equipment models, the database 38 is updated frequently with the latest information from the equipment manufacturers.

After a manufacturer and an equipment model are selected, the user selects a feature, step 76, from a list of programmable features for that model of radiotelephone. Preferably, the list of programmable features is presented in a user language and not in a technical language. For example, an item may be listed as "want the telephone to vibrate when someone calls me" instead of "set the telephone to vibrating mode."

The virtual technician 30 retrieves the programming tips from the database 38 and displays them in the instruction area 54. If the programming tips include video and audio files, then the video file will be played in the video display area 52 and the audio file will be played through audio circuitry of the radiotelephone. If the user chooses to have the virtual technician 30 program the radiotelephone for him, step 78, then the virtual technician 30 will proceed to gather necessary information from the user and then to program the radio telephone for him, step 80.

If the user accesses the virtual technician 30 by using his computer instead of his radiotelephone, the virtual technician 30 recognizes the platform as being a computer and does not attempt to program a radiotelephone.

In an alternate embodiment, the programming task 70 can read the radiotelephone's internal registers and retrieve the information on the manufacturer and the model, if the manufacturers build this information into the radiotelephone. In this embodiment, the user needs not to supply the manufacturer and model information to the programming task 70.

Now referring to FIG. 7, which illustrates an exemplary trouble shooting task 90. This trouble shooting task 90 is activated when the user selects the trouble shooting option from the selection area 56. After the user selects the trouble shooting task option, the user process 60 activates the trouble shooting task 90. The trouble shooting task 90 first prompts the user to select the equipment manufacturer, step 92, from a list of options. After the user selects the equipment manufacturer, the trouble shooting task 90 retrieves the available models, displays them to the user, and prompts the user for a selection, step 94.

After the manufacturer information and the model information are determined, the trouble shooting task 90 prompts the user to select a high level description of the problem, step 96. The high level description can be directed to a specific area of functionalities, such as speed dialing list, ringing volume, etc. After the general problem area is selected, the user can select specific symptoms of the problem from a list of common symptoms or malfunctions, step 98. The list of common symptoms may be compiled based on frequently asked questions. A list of trouble shooting tips are retrieved from the database 38 and displayed by the virtual technician 30 on the instruction area 54 after the user selects the specific symptoms.

Figure 8:
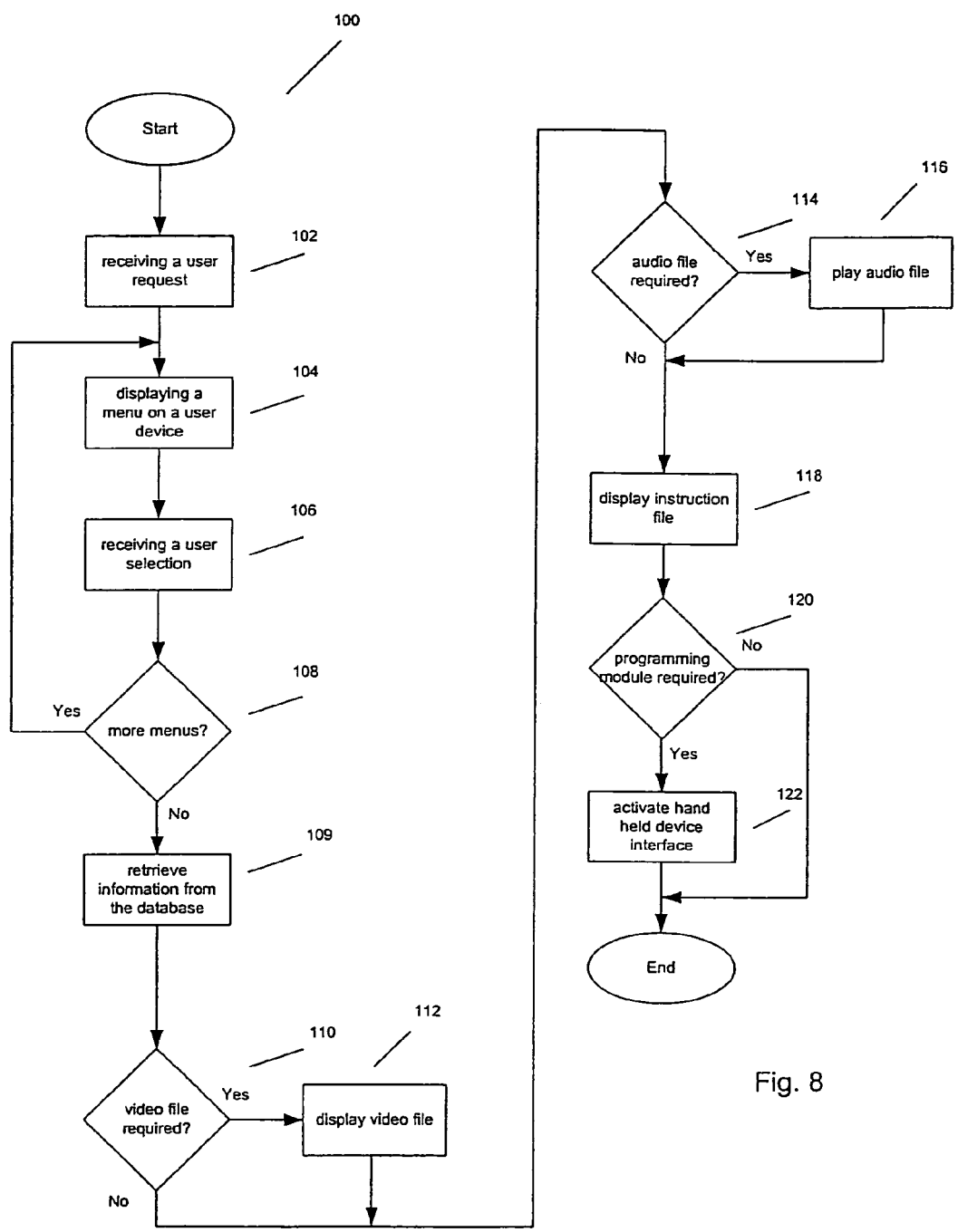
FIG. 8 illustrates a system process.

FIG. 8 illustrates a system process 100 for a virtual technician 30 according to one embodiment of the present invention. The virtual technician 30 receives a user request, step 102, and displays appropriate menus on the selection area 56. After the user selects an option from this menu, the virtual technician 30 receives the user's selection, step 106. If this selection leads to more menus, step 108, then additional menus are displayed. If no more menus are available, then the virtual technician 30 retrieves the information from a database, step 109.

The virtual technician 30 checks if there is any video file, step 110, associated with the information. If so, then the video file is displayed with assistance from the display controller 32, step 112. If an audio file is present, step 114, then the audio file is played though the audio component of the user device, step 116. Finally, the instruction file is displayed in the instruction area 54.

If the user is using a radiotelephone to activate the virtual technician 30 and chooses to have the virtual technician 30 to assist in programming the radiotelephone, then the hand-held device interface 40 is activated, step 122, for this task. The virtual technician 30 will not activate the hand-held device interface 40, if the virtual technician 30 is running on a user device that is not a radiotelephone.

The following is an exemplary description of a user using a radiotelephone and the virtual technician 30 to learn how to store a telephone number into a speed-dialing list. This description is loosely referred back to FIGS. 5-8.

The consumer, who purchased a radiotelephone and wireless service from the service provider, accesses the virtual technician 30 for instructions on storing a telephone number into the speed-dialing list in the radiotelephone. The radiotelephone is initially programmed and able to dial and receive telephone calls, and the user is initially given an access telephone number for on-line assistances. The user starts the process of storing the telephone number by activating the radiotelephone and dialing the access telephone number to access the virtual technician 30, step 62 of FIG. 5.

After the radiotelephone is connected to the server 12 for the on-line assistance, the server 12 transmits an initial menu to the radiotelephone, step 104 of FIG. 8. The initial menu may occupy the entire display area of radiotelephone and prompt the user to select a manufacturer and a model, steps 72, 74 of FIG. 6. The manufacturer and the model information are transmitted back to the server 12, step 10 of FIG. 8.

The server 12 then sends an appropriate virtual technician 30 to the radiotelephone. This virtual technician 30 is specific for the manufacturer and the model number and is equipped with an internal database 38. A specific virtual technician for a particular manufacturer and model can be made more compact than a generic virtual technician. The internal database 38 improves the performance of a virtual technician 30 by eliminating separated transmission of programming instructions, especially when the transmission is through radio frequency transmissions.

The virtual technician 30 displays an initial selection box, where the user can select the task he wants to perform, steps 104, 106 of FIG. 8. The user may elect, for example to get programming instructions or trouble shooting tips. In this exemplary description, the user selects the programming instructions.

The virtual technician 30 lists different features that the user can program for the radiotelephone, among them, the storing of a telephone number into a speed-dialing list. The user selects the option for storing a telephone number, step 76 of FIG. 6.

The virtual technician 30 then retrieves the information from the internal database 38, step 109 of FIG. 8, and displays it on the instruction area 54, step 118 of FIG. 8. If there is a video file associated with this information, then the virtual technician 30 displays the video file in the video area 52, steps 110, 112 of FIG. 8.

If the virtual technician 30 is equipped with the hand-held device interface module 40, then the virtual technician 30 prompts the user for the telephone number to be programmed, step 120 of FIG. 8. After the user provides the telephone number, the virtual technician 30 programs the telephone number into the speed-dialing list on the radiotelephone, step 122 of FIG. 8.

The foregoing description of the preferred embodiments of the invention has been presented only for the purpose of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated.

What is claimed is:

1. A virtual technician for assisting a user to operate a radiotelephone, the virtual technician being capable of interpreting a technical request and providing a solution for the request, the virtual technician comprising:
   a computer readable memory on which is stored a computer program, the computer program comprising instructions, when executed by a computer, perform:
   receiving a user input;
   receiving manufacturer data;
   receiving radiotelephone model data;
   searching for an answer to a user problem stated by the user input;
   displaying the answer to the user; and
      changing features of the radiotelephone by programming the radiotelephone automatically, the changing features of the radio telephone including:
      receiving an equipment manufacturer;
      receiving an equipment model;
      providing a list of programmable features for the model to the user; receiving a selected programmable feature from a user input; and
   programming the radiotelephone with the selected programmable feature in response to a user input.

2. The virtual technician of claim 1, wherein the computer program is executed in a client environment.

3. The virtual technician of claim 1, wherein the computer program is downloaded to a client environment and executed in its entirety in the client environment.

4. The virtual technician of claim 1, wherein the computer program further performs playing a video file associated with the answer.

5. The virtual technician of claim 4, wherein the video file is a MPEG (moving pictures experts group) file.

6. The virtual technician of claim 1 further comprising a database residing in the computer readable memory, the database storing information on a plurality of radiotelephones.

7. The virtual technician of claim 1 further comprising a database residing in the computer readable memory, wherein the database stores the answer to the user problem.

8. The virtual technician of claim 1, wherein the computer program further performs displaying a list of symptoms.

9. A method of providing operational instructions of a radiotelephone to a user, the method comprising:
   displaying a first menu in an instruction window, wherein the first menu lists a plurality of radiotelephone manufacturers;
   accepting a selection of a manufacturer;
   displaying a second menu in the instruction window, wherein the content of the second menu of options depends on the selection of the first option;
   accepting a selection of a second option;
   searching a database for a response, wherein the search uses the manufacturer's information;
   displaying the response in a response window; and
      changing features of the radiotelephone by programming the radiotelephone automatatically, the changing features of the radio telephone including:
      receiving an equipment manufacturer;
      receiving an equipment model;
      providing a list of programmable features for the model to the user; receiving a selected programmable feature from a user input; and
   programming the radiotelephone with the selected programmable feature in response to a user input.

10. The method of claim 9 further comprising displaying a video in a video window.

11. The method of claim 9, wherein the second menu is a list of subject topics.

12. The method of claim 9 further comprising displaying a third menu, wherein the third menu is a list of models of radiotelephones.

13. A method for assisting a user to program a radiotelephone, the method comprising:
   receiving first menu data from a server;
   displaying the first menu on a display device;
   accepting a first menu selection from the user; and
   changing internal settings of the radiotelephone based on the user's first menu selection by programming the radiotelephone automatically, the changing features of the radio telephone including:
   receiving an equipment manufacturer;
      receiving an equipment model;
      providing a list of programmable features for the model to the user; receiving a selected programmable feature from a user input; and
   programming the radiotelephone with the selected programmable feature in response to a user input.

14. The method of claim 13 further comprising
   retrieving manufacturer information from a first register in the radiotelephone; and
   retrieving model information from a second register in the radiotelephone.

15. The method of claim 13 further comprising:
   displaying a second menu, wherein the second menu is a list of radiotelephone models.

16. The method of claim 13 further comprising
   displaying a second menu, wherein the second menu is a list of symptoms of radiotelephone malfunctions.

* * * * *